US012602228B2

(12) United States Patent
Yousefzadeh et al.

(10) Patent No.: US 12,602,228 B2
(45) Date of Patent: Apr. 14, 2026

(54) NEUROMORPHIC PROCESSOR AND NEUROMORPHIC PROCESSING METHOD

(71) Applicant: Snap Inc., Santa Monica, CA (US)

(72) Inventors: Amirreza Yousefzadeh, Eindhoven (NL); Orlando Miguel Pires Dos Reis Moreira, Eindhoven (NL); Gokturk Cinserin, Son en Breugel (NL)

(73) Assignee: Snap Inc., Santa Monica, CA (US)

( * ) Notice: Subject to any disclaimer, the term of this patent is extended or adjusted under 35 U.S.C. 154(b) by 1235 days.

(21) Appl. No.: 17/442,987

(22) PCT Filed: Mar. 26, 2020

(86) PCT No.: PCT/EP2020/058501
§ 371 (c)(1),
(2) Date: Sep. 24, 2021

(87) PCT Pub. No.: WO2020/193689
PCT Pub. Date: Oct. 1, 2020

(65) Prior Publication Data
US 2022/0171619 A1 Jun. 2, 2022

(30) Foreign Application Priority Data
Mar. 26, 2019 (EP) .................................... 19165180

(51) Int. Cl.
*G06F 9/30* (2018.01)
*G06N 3/063* (2023.01)
(52) U.S. Cl.
CPC ........... *G06F 9/3001* (2013.01); *G06N 3/063* (2013.01)

(58) Field of Classification Search
CPC .............................. G06F 9/3001; G06N 3/063
See application file for complete search history.

(56) References Cited

FOREIGN PATENT DOCUMENTS

| | | |
|---|---|---|
| EP | 3716153 | 9/2020 |
| EP | 3948676 | 2/2022 |
| WO | 2020193689 | 10/2020 |

OTHER PUBLICATIONS

Davies, Mike, et al. "Loihi: A neuromorphic manycore processor with on-chip learning." Ieee Micro 38.1 (2018): 82-99. (Year: 2018).*

(Continued)

*Primary Examiner* — Ann J Lo
(74) *Attorney, Agent, or Firm* — Schwegman Lundberg & Woessner, P.A.

(57) ABSTRACT

A neuromorphic processor and a neuromorphic processing method are provided. The neuromorphic processor includes a plurality of neuromorphic elements, a message exchange facility, and a computation unit. The plurality of neuromorphic elements each has a respective state memory entry for storing their state. The message exchange facility enables neuromorphic elements to transmit neural event messages, and to receive transmitted neural event messages. A neural event message includes a message type indicating that the neural event message is an accumulation message or a leakage message. An accumulation message instructs the computation unit to modify a state value of a destination neuromorphic element by addition or subtraction of a value indicated as a message parameter in the accumulation message. A leakage message instructs the computation unit to modify the state value by reduction of the state value with a leakage value that is correlated with the state value.

20 Claims, 7 Drawing Sheets

(56) References Cited

OTHER PUBLICATIONS

Akopyan, Filipp, et al. "Truenorth: Design and tool flow of a 65 mw 1 million neuron programmable neurosynaptic chip." IEEE transactions on computer-aided design of integrated circuits and systems 34.10 (2015): 1537-1557. (Year: 2015).*

Furber, Steve B., et al. "The spinnaker project." Proceedings of the IEEE 102.5 (2014): 652-665. (Year: 2014).*

European Patent Office, International Search Report in corresponding International Application No. PCT/EP2020/058501, dated Jun. 16, 2020 (2 pages).

Azghadi et al., "Spike-Based Synaptic Plasticity in Silicon: Design, Implementation, Application, and Challenges," Proceedings of the IEEE, vol. 102, No. 5, pp. 717-737 (2014) XP11546620, May 2014.

Furber et al., "The SpiNNaker Project," Proceedings of the IEEE, vol. 102, No. 5, pp. 652-665 (May 2014) XP011546624.

"International Application Serial No. PCT/EP2020/058501, Written Opinion mailed Jun. 16, 2020", 7 pgs.

"International Application Serial No. PCT/EP2020/058501, International Preliminary Report on Patentability mailed Oct. 7, 2021", 9 pgs.

"European Application Serial No. 19165180.1, Extended European Search Report mailed Sep. 13, 2019", 7 pgs.

"European Application Serial No. 19165180.1, Noting of loss of rights mailed Apr. 22, 2021", 2 pgs.

"European Application Serial No. 20714211.8, Response to Communication pursuant to Rules 161(1) and 162 EPC filed Dec. 28, 2021", 15 pgs.

Akopyan, Filipp, "True North: Design and Tool Flow of a 65 mW 1 Million Neuron Programmable Neurosynaptic Chip", IEEE Transactions on Computer-Aided Design of Integrated Circuits and Systems, vol. 34, No. 10, (Oct. 2015), 1537-1557.

Orchard, Garrick, "HFirst: A Temporal Approach to Object Recognition", arXiv:1508.01176v1 [cs.CV], (Aug. 5, 2015), 13 pgs.

Yousefzadeh, A., "Hardware Implementation of Convolutional STDP for On-line Visual Feature Learning", May 2017 IEEE International Symposium on Circuits and Systems (ISCAS), (2017), 4 pgs.

"European Application Serial No. 20714211.8, Communication Pursuant to Article 94(3) EPC mailed Jun. 26, 2024", 6 pgs.

"European Application Serial No. 20714211.8, Response filed Oct. 8, 2024 to Communication Pursuant to Article 94(3) EPC mailed Jun. 26, 2024", 19 pgs.

"New international patent application in the name of GrAI Matter Labs S.A.S. claiming priority from EP 19165180.1 filed on Mar. 26, 2019", PCT Direct / informal comments filed Mar. 24, 2020, 10 pgs.

* cited by examiner

| NA | MT | MP1,..,m |
|----|----|----------|

| NA | A | SGN | W |
|----|---|-----|---|

| NA | L | τ | Bias |
|----|---|---|------|

NEUROMORPHIC PROCESSOR AND NEUROMORPHIC PROCESSING METHOD

CROSS-REFERENCE TO RELATED APPLICATIONS

This patent application is a U.S. National Phase of PCT International Application No. PCT/EP2020/058501, filed Mar. 26, 2020, which claims priority to European Application No. 19165180.1, filed Mar. 26, 2019, which are both expressly incorporated by reference in their entireties, including any references contained therein.

BACKGROUND

Neuromorphic processors are contemplated as an approach to address massive computation tasks. A neuromorphic processors comprises a plurality of neuromorphic elements that communicate by event-messages which has some similarity to a brain in which neurons are interconnected to each other by synapses, enabling them to transmit data as a spike when their membrane potential representing their state exceeds a threshold value. A spike transmitted by a neuron can result in an increase or a decrease of the membrane potential of the recipient neuron. One phenomenon occurring in biological neurons is leakage. As a result thereof, the membrane potential of a neuron gradually decreases if it does not receive any spikes at its input synapses.

According to a first, synchronous approach to mimic this phenomenon in a neuromorphic processor, neuron leakage is computed by periodically subtracting a leak value from each membrane potential. This approach is described for example by Filipp Akopyan et al, in "TrueNorth: Design and Tool Flow of a 65 mW 1 Million Neural unit Programmable Neurosynaptic Chip", IEEE Transactions on Computer-Aided Design of Integrated Circuits and Systems (Volume: 34, Issue: 10, October 2015)|https://ieeexplore.ieee.org/document/7229264/. Also A. Yousefzadeh et al, describe this approach in "Hardware Implementation of Convolutional STDP for On-line Visual Feature Learning" in an IEEE International Symposium on Circuits and Systems, May 2017.

A different approach is described by G. Orchard et al. in "HFirst: A Temporal Approach to Object Recognition", arXiv:1508.01176v1. Therein a neuromorphic element's new state (membrane potential) is determined by the time since it was last updated, and its state after the previous update. It is an advantage of this approach as compared to the synchronous approach, that a neuromorphic element need only be updated when it receives an input spike (rather than at a constant time interval). It is a disadvantage of this second approach however, that it has additional storage requirements in that for each neuromorphic element a storage location is required to store an indication for the point in time when it was last updated. In practice, the dynamic range defined by a smallest update time interval and a largest time interval may be large. For example, the length of this time-interval may vary between a few micro-seconds up to hours and days. In order to guarantee proper functionality of the method, within this dynamic range, a large storage space is required for each neuromorphic element.

SUMMARY

It is an object of the present disclosure, to provide a neuromorphic processor, which is improved in that it enables a reduction in specific leakage operations, while avoiding the necessity of additional storage requirements.

In accordance with this object, the neuromorphic processor comprises:

a plurality of neuromorphic elements having a respective state memory entry for storing its state;

a message exchange facility to enable neuromorphic elements to transmit neural event messages, and to receive transmitted neural event messages, a neural event message including an indication of one or more neuromorphic elements selected as the destination, a message type and one or more message parameters;

a computation unit to update the state dependent on received neural event messages;

wherein the message type is one of at least an accumulation message and a leakage message, wherein the accumulation message instructs the computation unit to modify the state value of the destination neuromorphic element by addition or subtraction of a value indicated as a message parameter in the message, and wherein the leakage message instructs the computation unit to modify the state value by reduction of the state value with a leakage value that is correlated with the state value, and which may be further dependent on one or more leakage parameters contained in the leakage message.

In the improved neuromorphic processor, it is not necessary to provide for a means that synchronously causes a leakage to occur in all neuromorphic elements. Instead, leakage of a neuromorphic element can be realized by transmission of a leakage message to the destination neuromorphic element where leakage is to occur. Additional memory requirements are avoided, as the leakage can be computed from the current state value of the neural element and the information contained in the leakage message. The leakage value with which the state value is reduced is correlated with the state value in that the leakage value is at least substantially monotonically related to the state value. The actual relationship may deviate from a purely monotonic relationship for example in that the leakage value is related stepwise to the state value, or that the leakage value is clipped between a minimum and a maximum value.

In an embodiment, the leakage message instruct the computation unit to modify the state value by reduction of the state value with a leakage value equal to a binary shifted difference between the state value and a bias value. Therewith the leakage value so obtained is stepwise proportional to the difference between the bias value and the bias value and can be computed efficiently. The leakage value is clipped to 0 if the state value is equal to the bias value.

In an embodiment, the binary shift is specified by a binary shift value specified as a parameter in the leakage message. The binary shift value is a measure representative for a time lapsed between subsequent updates In an embodiment, the bias value is specified as a parameter in the leakage message. Alternatively, the bias value maybe a predetermined value, e.g. 0.

In an embodiment, a further neuromorphic element is configured to generate leakage messages. Alternatively, or additionally, the neuromorphic processor may further comprise at least one programmable element having access to the message exchange facility. Therein, the message exchange facility enables the at least one programmable element to transmit messages, the messages to be transmitted including at least leakage messages destined for a neuromorphic element from said plurality of neuromorphic elements and to receive messages from a neuromorphic element or from another programmable element.

In an embodiment, the programmable elements and neuromorphic elements are distinct types of elements, each having hardware dedicated to their specific functions. Using respective dedicated hardware for each of the programmable elements and the neuromorphic elements enables a highly optimized functionality of each of these elements. Alternatively, or in addition, the neuromorphic processor may comprise configurable processing elements that can either be configured as a programmable element or as a neuromorphic element. The presence of configurable processing elements contributes to the versatility of the neuromorphic processor.

In case the neuromorphic processor comprises programmable elements in addition to neuromorphic elements, the programmable elements may be provided in a programmable cluster, wherein the plurality of programmable elements share a common memory facility and a common network interface unit proper to said programmable cluster. Similarly, a plurality of neuromorphic elements may form a neuromorphic cluster of neuromorphic elements wherein the plurality of neuromorphic elements share a common memory facility and a common network interface unit proper to said neuromorphic cluster. The neuromorphic cluster may include a computation unit and a state memory, which computation unit updates the states of the plurality of neuromorphic elements on a time-shared basis, wherein the state memory entries are individually addressable by the time-shared computation unit within the state memory.

As an alternative for neuromorphic elements arranged in a neuromorphic cluster sharing a computation unit and a state memory, each neuromorphic element may comprising a respective computation unit having dedicated access to its state memory entry, for example being part of its respective computation unit.

The neuromorphic processor may comprise a plurality of programmable clusters and a plurality of neuromorphic clusters, all clusters having access to the message exchange network.

In accordance with the above-mentioned object furthermore, a neuromorphic processing method is provided that comprises the following steps:

storing a state of a plurality of neuromorphic elements in a respective state memory entry;

enabling neuromorphic elements to transmit neural event messages, and to receive transmitted neural event messages, a neural event message including an indication of one or more neuromorphic elements selected as the destination, a message type and one or more message parameters;

updating the state dependent on received neural event messages;

wherein the message type is one of at least an accumulation message and a leakage message, wherein said updating in case of an accumulation message is modifying the state value of the destination neuromorphic element by addition or subtraction of a value indicated as a message parameter in the accumulation message, and wherein said updating in case of a leakage message is modifying the state value by reduction of the state value with a leakage value that is correlated with the state value and further dependent on e one or more leakage parameter contained in the leakage message.

4

Figures 1, 2A, 2B, 2C:
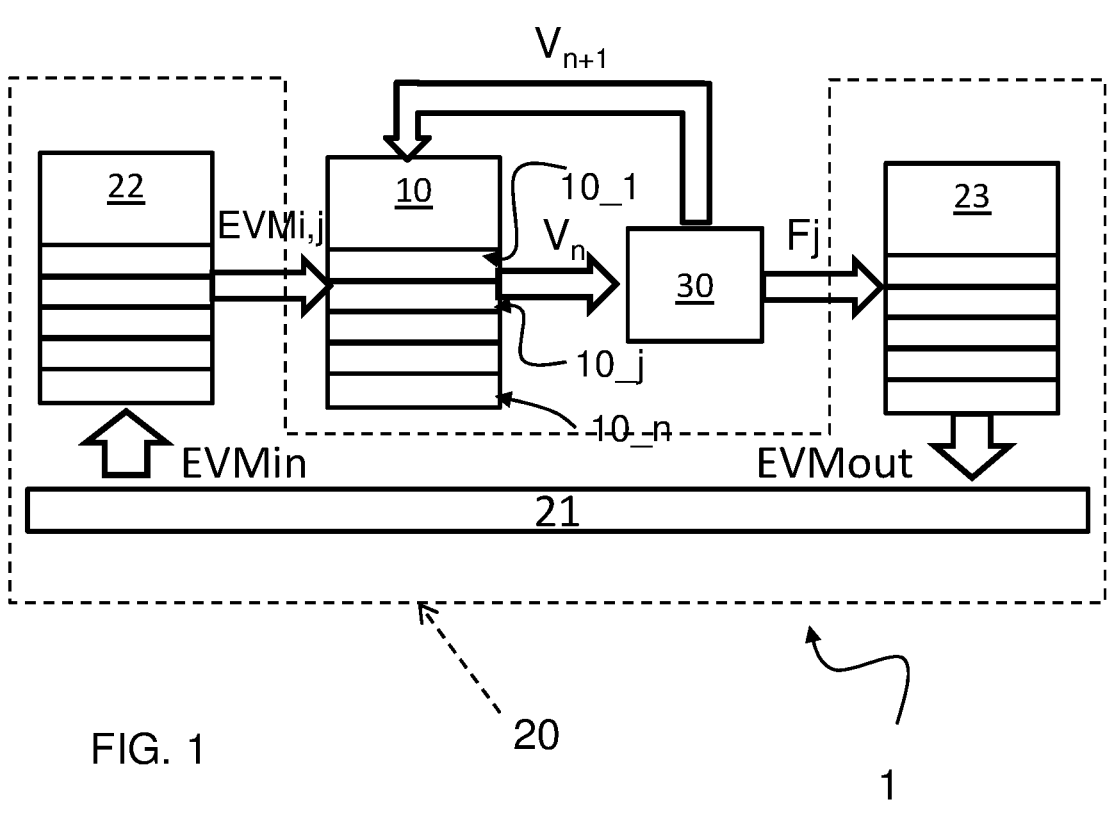
FIG. 1 schematically shows an example of a neuromorphic processor comprising a plurality of neuromorphic elements, a message exchange facility, and a computation unit.

FIG. 2A shows a general format of a message that may be received by a neuromorphic element.

FIG. 2B shows an example of an accumulation message.

FIG. 2C shows an example of a leakage message.

Figure 3A:
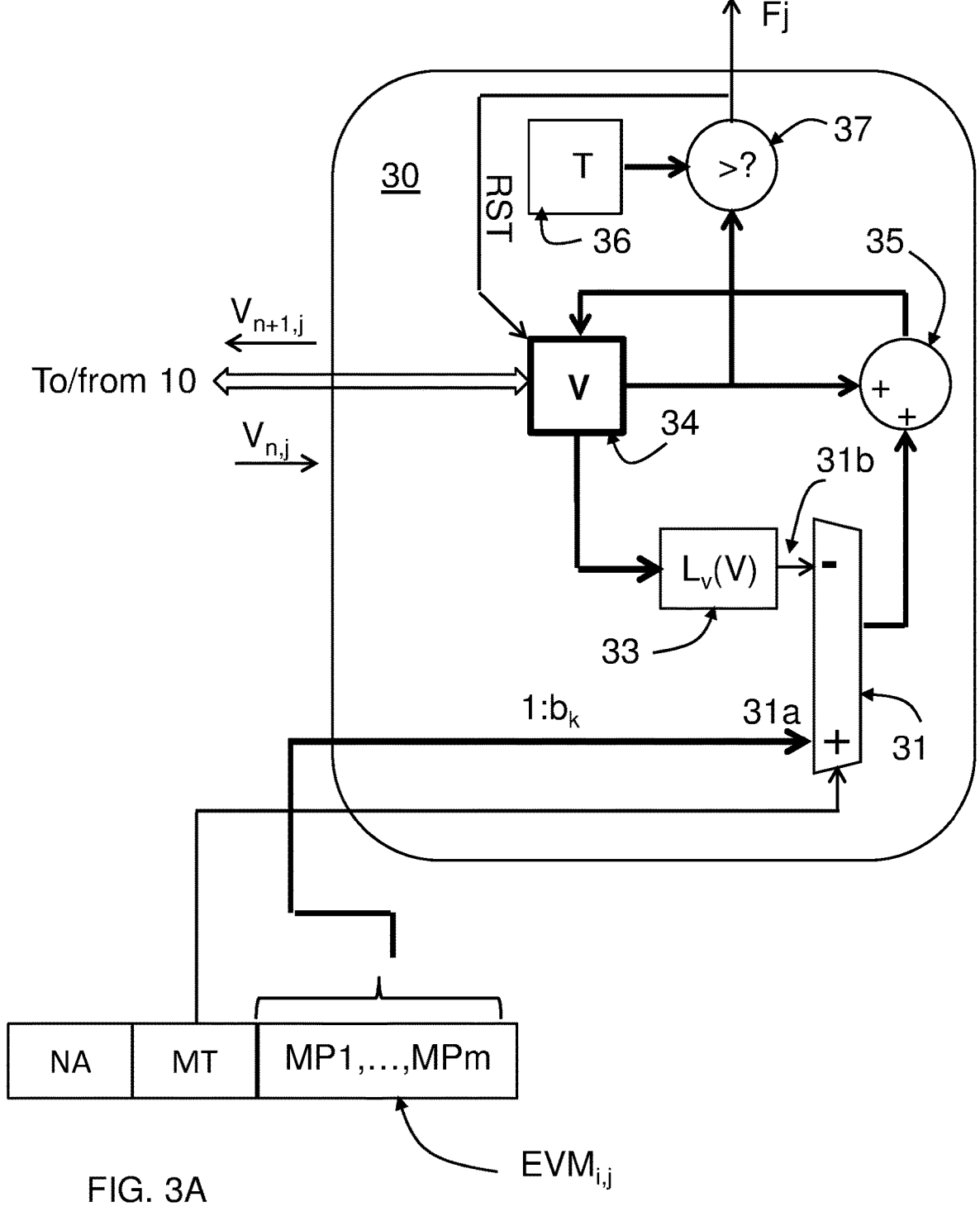

FIG. 3A schematically shows an example of a computation unit that may be shared by a plurality of neuromorphic elements.

Figure 3B:
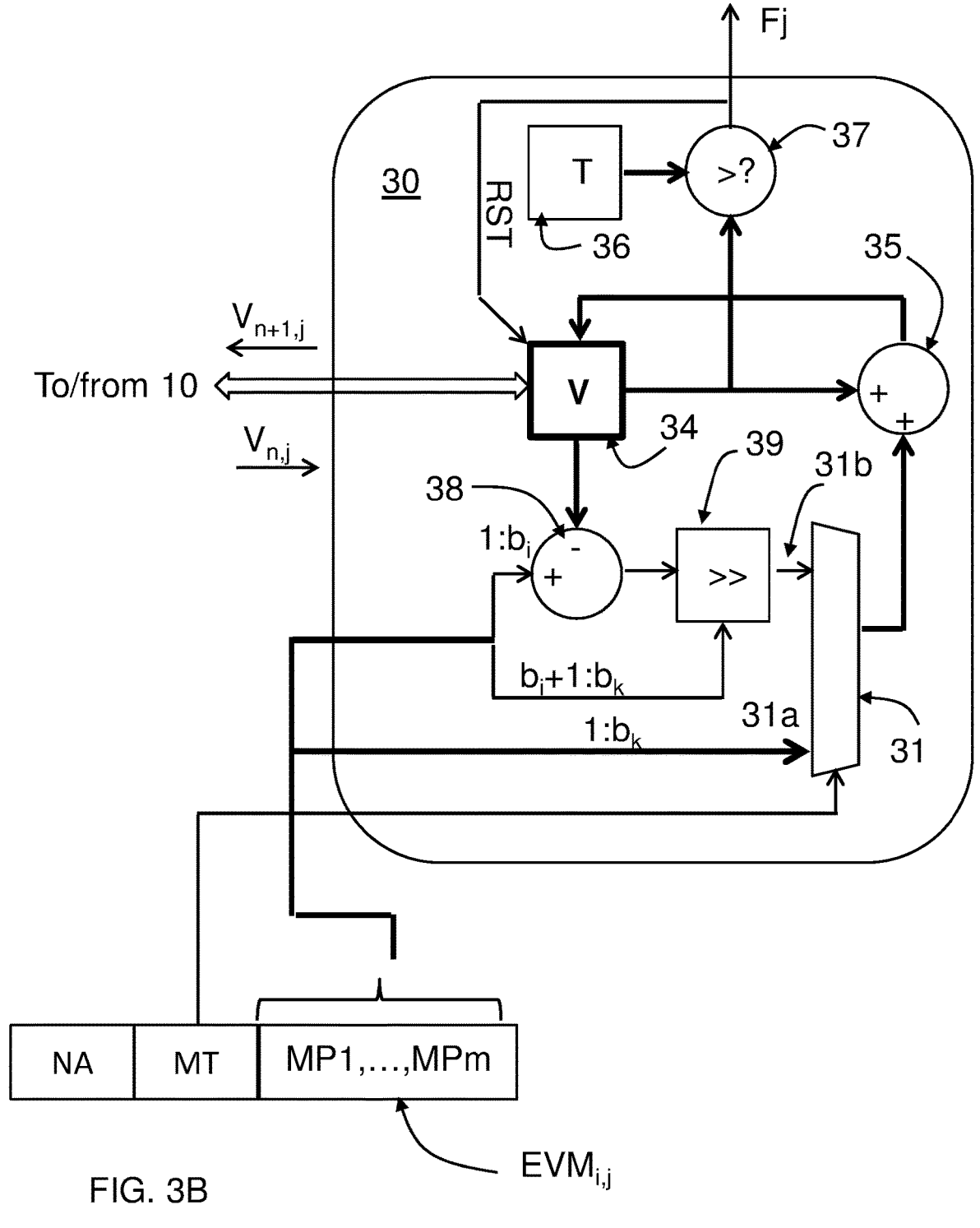

FIG. 3B shows another example of a computation unit that may be shared by a plurality of neuromorphic elements.

Figure 4:
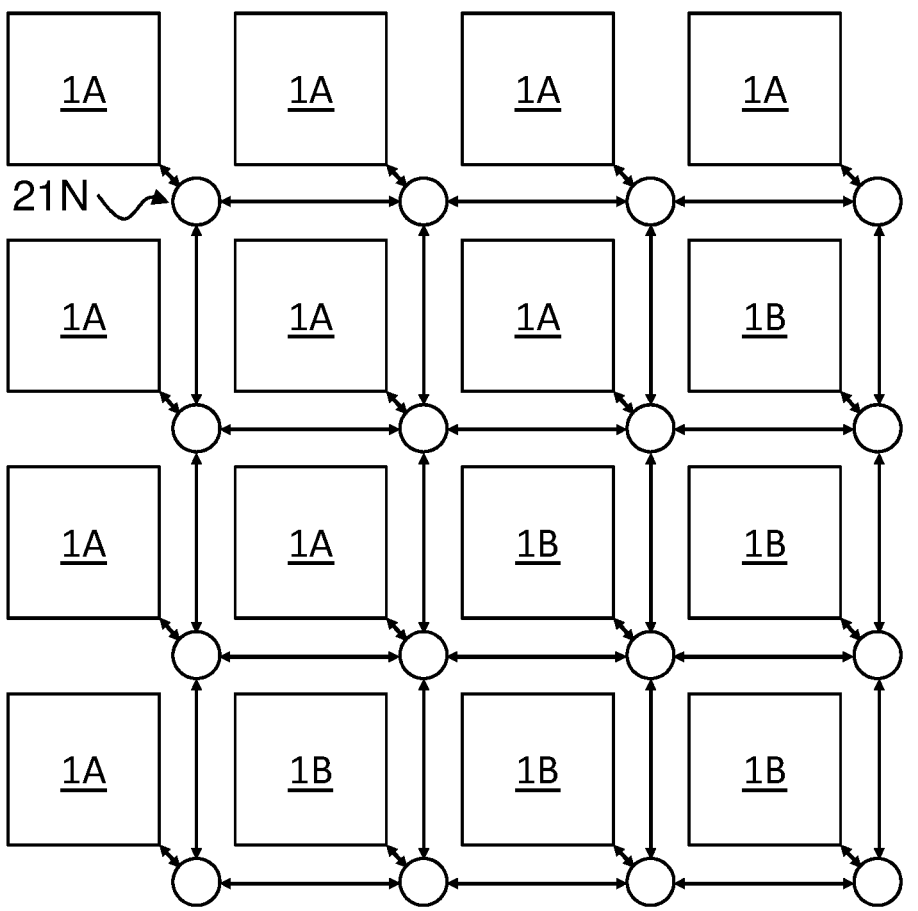

FIG. 4 illustrates an embodiment of the neuromorphic processor that comprises a plurality of clusters.

Figure 5:
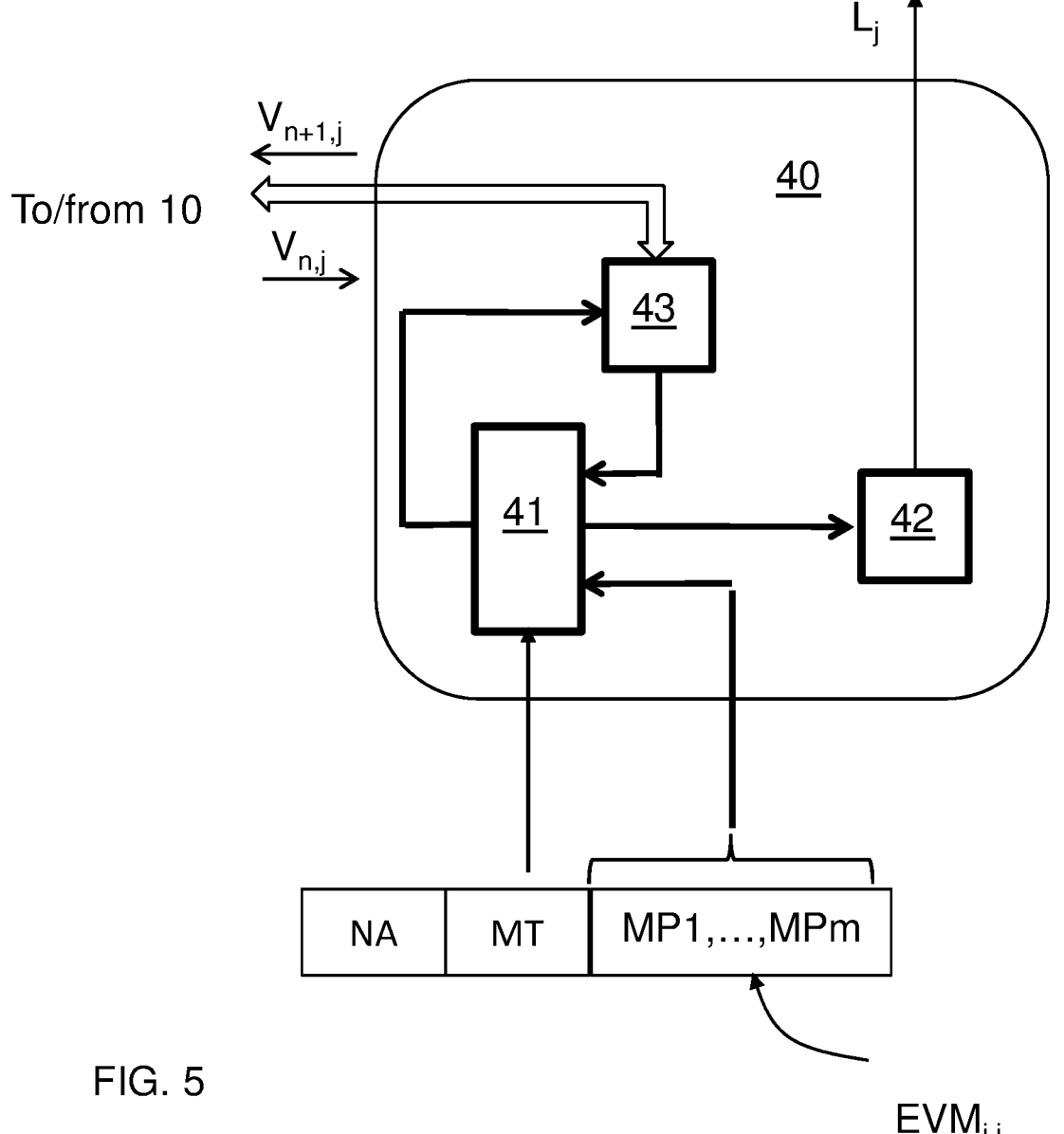

FIG. 5 shows an exemplary computation unit for a programmable cluster.

Figure 5A:
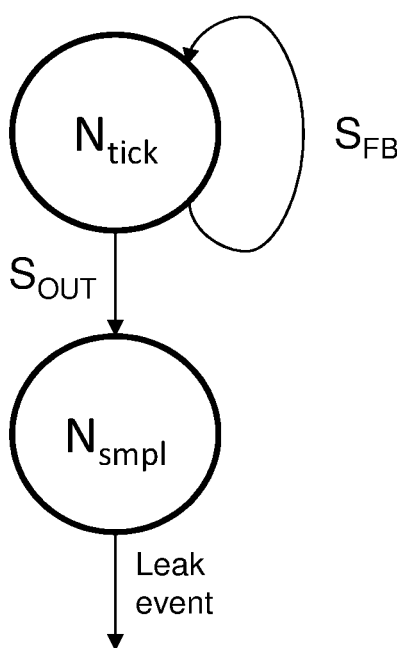

FIG. 5A shows a pair of neuromorphic elements that is configured to generate leakage messages to other neuromorphic elements.

Figure 6:
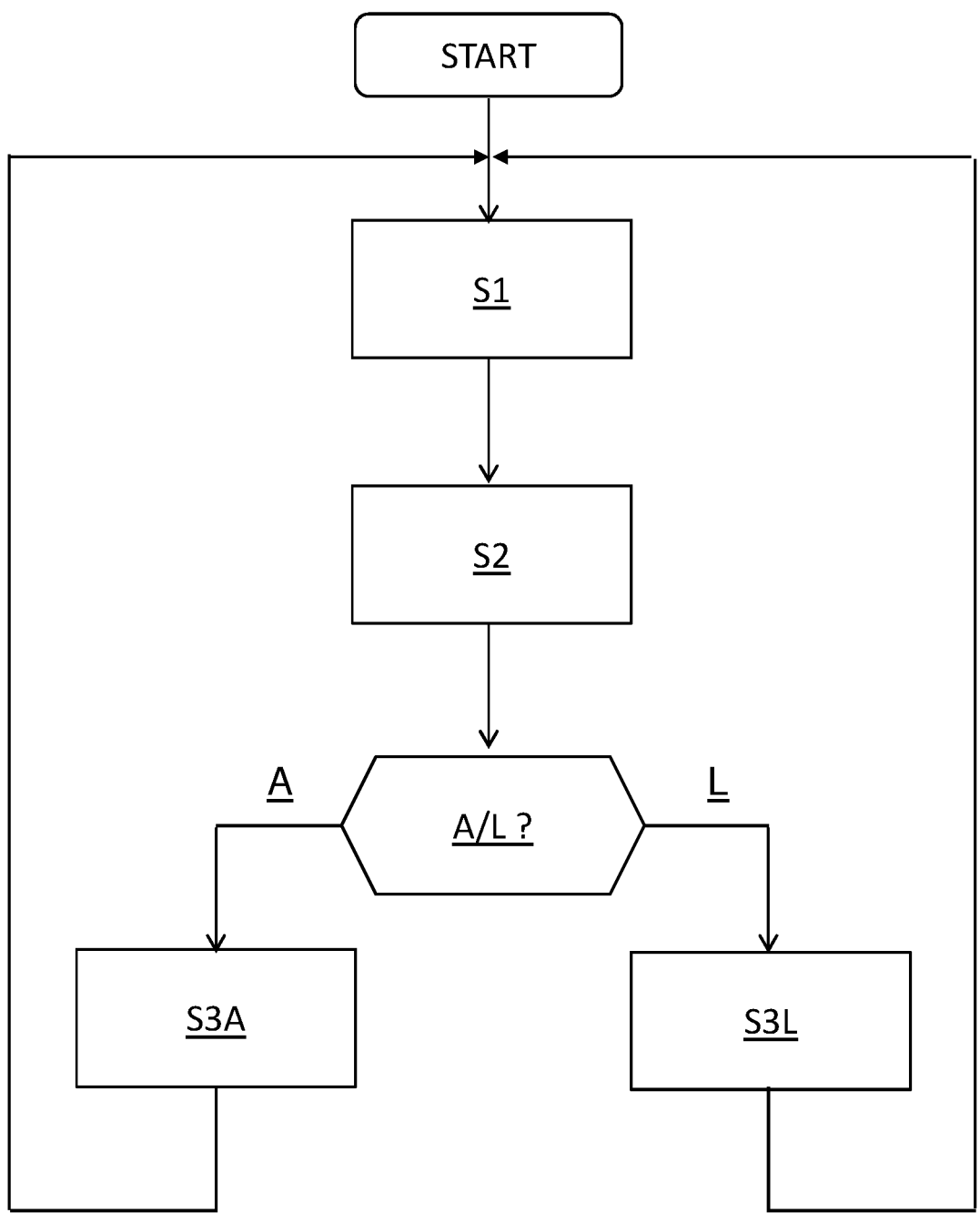

FIG. 6 schematically shows an embodiment of a neuromorphic processing method.

DETAILED DESCRIPTION OF EMBODIMENTS

FIG. 1 schematically shows a neuromorphic processor 1 comprising a plurality of neuromorphic elements, a message exchange facility 20, and a computation unit 30.

The plurality of neuromorphic elements each have a state memory entry 10_$i$ in a state memory 10 for storing its state.

The message exchange facility 20 enables neuromorphic elements to transmit neural event messages, and to receive transmitted neural event messages. A neuromorphic element may for example transmit a neural event message to another neuromorphic element or to itself. Also a neuromorphic element may transmit a neural event message to a set of neuromorphic elements, again possibly including itself. As shown in FIG. 2A, a neural event message includes an indication NA of one or more neuromorphic elements selected as the destination, a message type MT and one or more message parameters MP1, m.

The computation unit 30 is to update the state dependent on received neural event messages.

The message type MT is one of at least an accumulation message and a leakage message. An accumulation message (MT=A) as shown in FIG. 2B instructs the computation unit 30 to modify the state value V of the destination neuromorphic element by addition or subtraction of a value W indicated as a message parameter in the message. A leakage message (MT=L) as shown in FIG. 2C instructs the computation unit 30 to modify the state value by reduction of the state value V with a leakage value $L_v$, that is correlated with the state value and optionally further dependent on one or more leakage parameters contained in the leakage message L. Examples thereof are described in more detail with reference to FIGS. 3A and 3B below.

In the embodiment shown in FIG. 1, the computation unit 30 is a time-shared computation unit for a plurality of neuromorphic elements. The state memory entries 10_1, 10_$i$, 10_$n$, in the state memory 10 are individually addressable by the time-shared computation unit 30. In the embodiment of FIG. 1, the message exchange facility 20 comprises a network on chip (NoC) 21, an event-message queue 22 and a synapse table 23. Event messages provided to, and received from the network 21 are generally denoted herein as EVMout and EVMin respectively. The exchanged event-messages include messages EVMi,j, wherein i,j respectively are the identifications of the transmitting and receiving neuromorphic elements that are involved. In operation, the time-shared computation unit alternately fetches the state of a recipient neuromorphic element "j" from its corresponding state memory entry 10_j in the state memory 10. In response to the received event-message $EVM_{i,j}$ it updates the state, here represented by membrane potential $V_n$ and writes the updated value $V_{n+1}$ to the state memory entry 10_j. When it is the case that the updated membrane potential $V_{n+1}$ were to exceed a threshold, instead its value is reset, e.g. to a value "0" before it is rewritten to the state memory entry and an event message $EVM_{j,k}$ is transmitted as $EVM_{out}$ to one or more destination neuromorphic elements k in accordance with connectivity information in synapse table 23. After transmission via the NoC 21, messages for recipients are entered in the event-message queue 22 until they are fetched therefrom by the time-shared computation unit 30. In this example the condition of exceeding the threshold is signaled by computation unit 30 as a signal Fj to synapse table 23, and the destination(s) for the corresponding event $EVM_{j,k}$ are identified with synapse table 23. Separate control facilities may be provided for controlling exchange of event-messages through the message exchange facility 20 for relieving the computation unit 30. Alternatively, these control tasks may be performed by the computation unit 30, for example, when the computation unit 30 is a generally programmable processor on which the neuromorphic processor is implemented.

FIG. 2A shows a general format of a message $EVM_{i,j}$ that may be received by a neuromorphic element j. The message includes an indication NA specifying the recipient neuromorphic element j, a message type indicator MT, and a message parameter field MP1, m. The message parameter field may be partitioned depending on the message type.

By way of example, FIG. 2B shows an accumulation message MT=A, wherein the parameter field includes a weight W, preceded by a sign bit SGN.

FIG. 2C shows a leakage message MT=L. In that case, the parameter field may include one or more parameters for controlling the nature of the correlation between the state value and the leakage value. The leakage message may for example comprise a leakage parameter Bias. This parameter indicates a threshold value. No leakage occurs unless the state value exceeds this threshold value. As another example, a leakage parameter T may be contained in the leakage message, which is a measure for a leakage time. Dependent on the value of this leakage parameter T, it can be controlled by the leakage message whether the leakage value corresponds to that of a shorter or of a longer duration in time FIG. 3A schematically shows a computation unit 30 that may be shared by a plurality of neuromorphic elements. For illustration purposes the computation unit 30 is shown as a unit comprising dedicated hardware. It will be understood that the computation unit 30 may alternatively be implemented as a suitably configured FPGA, or as program on a programmable processor. In this example, the computation unit 30 includes a register 34, which in operation receives a state $V_{n,j}$ from a memory entry 10_j in memory 10. The computation facility 30 updates the state $V_{n,j}$ to new state $V_{n+1,j}$ dependent on received neural event messages $EVM_{i,j}$ which it receives for neuromorphic element j from the network 21. In the embodiment shown, the message type MT determines a selection in a multiplexer 31. If the message $EVM_{i,j}$ is an accumulation message, indicated by MT=A, the multiplexer 31, selects the value at its input 31a to be provided as its output to an adder 35. The adder 35 therewith computes a new state value $V_{n+1,j}$ as:

$V_{n+1,j} \leftarrow V_{n,j} +/- W$, dependent on a sign SGN contained in the accumulation message A.

The value $V_{n+1,j}$ is compared by comparator 37 with a threshold value T in register 36. If the value $V_{n+1,j}$ exceeds the threshold T, the computation unit 30 signals the synapse table 23 with signal Fj that a firing event message is to be transmitted to one or more recipient neuromorphic elements and the state of neuromorphic element j is reset, using signal RST to accumulator 34 as:

$V_{n+1,j} \leftarrow \text{RESET\_VALUE}$

RESET_VALUE may be equal to 0, but may alternatively have another value. The computation unit 30 may then proceed with a next message. If the next message is for a different neuromorphic element, it writes the state $V_{n+1,j}$ from register 34 to memory entry 10_j in memory 10, and it loads the present state of that different neuromorphic element into the state register 34. If the next message concerns the same neuromorphic element it can skip this step.

If the message $EVM_{i,j}$ is a leak message, indicated by MT=L, the multiplexer 31, selects the leakage value, inverted at its input 31b to be provided as its output to the adder 35. The leakage value at input 31b is computed by computation element 33 as a function $L_v()$ of the state value V. The leakage value computed by this function is correlated with the state value V in that the leakage value is at least substantially monotonically related to the state value. Generally higher state values result in higher leakage values. The actual relationship may deviate from a purely monotonic relationship for example in that the leakage value is related stepwise to the state value, or that the leakage value is clipped between a minimum and a maximum value. Also it may be contemplated to apply a random leakage value, which has a higher probability to differ from 0, at higher values of the state.

Leakage messages may be generated by a programmable element that has access to the message exchange facility. The message exchange facility therewith enables the programmable element to send events to one or more neuromorphic elements. Also the message exchange facility may enable the programmable element to receive messages from a neuromorphic element or from another programmable element.

Programmable elements and neuromorphic elements may be distinct types of elements, each having hardware dedicated to their specific functions. Alternatively, more versatile elements may be used that can either be configured as a programmable element or as a neuromorphic element.

FIG. 3B shows another example of a computation unit 30 that may be shared by a plurality of neuromorphic elements. Parts therein corresponding to those of FIG. 3A have the same reference, unless otherwise stated. In the example shown in FIG. 3B, the value at input 31b of multiplexer 31 is computed by subtraction element 38 and shift element 39 as $V_{31b} = (\text{Bias} - V_{n,j}) >> \tau,$ Therein parameters Bias, $\tau$ respectively are obtained as bits 1 to $b_i$ and bits $b_{i+1}$ to $b_k$ in the parameter field of the instruction.

Therewith the new state value is computed as:

$V_{n+1,j} \leftarrow V_{n,j} - ((V_{n,j} - \text{Bias}) >> \tau)$

Therein the symbol ">>" represents a binary shift right operation with $\tau$ binary digits, which can alternatively be written as a division by $2^\tau$. The binary shift right operation can be efficiently performed. The parameter T makes it possible to control the effect of the leakage. A relatively high value for the parameter τ corresponds to a short leakage interval and thus a reduction with a relatively small leakage value. A relatively low value for the parameter τ corresponds to a long leakage interval and thus a reduction with a relatively large leakage value. A value of 0 for the parameter τ corresponds to an infinite time-interval so that the leakage message in that case may result in a complete reset of the neuromorphic element receiving the leakage message. Whether or not this is the case, may depend on whether the leakage value depends on further parameter(s). For example, the leakage value may be computed from the difference of the state value and a value of a parameter "Bias". If the value of the Bias-parameter is non-zero, the leakage value only differs from 0 if the state value exceeds the Bias-parameter value. In the example shown in FIG. 3B, it is presumed that the Bias-parameter is included in the leakage message. In this example the first bi parameter bits specify the Bias-parameter value and the remaining bits $b_{i+1}:b_k$ specify the shift value. Alternatively, default parameter values may be used, for example the parameter τ or for the parameter Bias may have a fixed value (for example bias may have a fixed value of 0), or may have a value which is configured for individual neuromorphic elements.

By way of example FIG. 4 illustrates an embodiment of the neuromorphic processor, that comprises a plurality of clusters, including programmable clusters 1A and neuromorphic clusters 1B. The neuromorphic clusters 1B may be provided as shown in FIG. 1. The programmable clusters 1A may be provided in a similar manner, apart from their implementation of the computation unit 30. A computation unit of a programmable cluster 1A, e.g. a computation unit 40 as shown in FIG. 5 may be capable of performing more complex arithmetic operations, like multiplication and division. To that end the computation unit 40 includes an ALU 41. Furthermore, the computation unit 40 includes a timer unit 42 which may be controlled by ALU 41 to periodically signal a leakage event Lj. In a manner analogous to the distribution of a firing event message in the neuromorphic clusters, a synapse table is provided that prepares a leakage event message to be distributed by the network from the network interface 21N to the designated neuromorphic elements.

In an embodiment, a computation unit 40, may be configurable to additionally perform the operations of a computation unit 30 for neuromorphic computation purposes.

In a further embodiment, a computation unit 30 for neuromorphic computation purposes may enable transmission of leakage event-messages. For example a computation unit 30 for neuromorphic computation purposes may execute a pair of neuromorphic elements $N_{tick}$, $N_{smpl}$ as shown in FIG. 5A. In this example, the neuromorphic element $N_{tick}$, is configured to spike at a constant value with every incoming spike. $N_{tick}$ can either be externally triggered or triggered during state initialization. Once triggered it continues spiking due to the self synaptic connection $S_{FB}$ (clock behavior). It is further coupled by output synaptic connection $S_{OUT}$ to neuromorphic element $N_{smpl}$. The latter has a gradually accumulating state value due to the incoming spike messages from $N_{tick}$. When its state value attains a pre-set threshold it issues a Leak event, falls back to its reset state and starts accumulating again. The period with which it issues the Leak event can be easily adapted by setting the value for the pre-set threshold and/or the weight with which it receives its input from $N_{tick}$ via the synaptic connection $S_{OUT}$.

FIG. 6 schematically shows an embodiment of a neuromorphic processing method. The method may comprise the following actions:

A state of a plurality of neuromorphic elements is stored, S1, in a respective state memory entry. The stored state is maintained in its memory entry, until it is replaced by an updated state. The state memory entry may be in a dedicated memory unit for each neuromorphic element, or may be an individually addressable memory entry in a state memory shared by a set of neuromorphic elements.

Neuromorphic elements are enabled, S2, to transmit neural event messages, and to receive transmitted neural event messages. A neural event message includes an indication of one or more neuromorphic elements selected as the destination, a message type and one or more message parameters.

Updating of a state of a neural element is dependent on received neural event messages. The message type is one of at least an accumulation message A and a leakage message L. In case the message is an accumulation message A, the state value of the destination neuromorphic element is modified, S3A, by addition or subtraction of a value indicated as a message parameter in the accumulation message. In case the message is a leakage message L, the state value is modified S3L by reduction with a leakage value that is correlated with the state value and further dependent on one or more leakage parameters contained in the leakage message.

Whereas FIG. 6 illustrates the actions of the method in the form of a sequential procedure, in practice the actions will typically be performed in parallel. For example, while a state computation is performed for a neuromorphic element, message transmission may take place for other neuromorphic elements, while further a state update of again another neuromorphic element in its dedicated memory entry takes place.

It is noted that various control functions may be performed by dedicated controllers. Alternatively a controller may perform various control functions. For example in a time shared manner. A controller for performing one or more control functions may be implemented in dedicated hardware, in a programmable or configurable device or a combination thereof. The computation unit 30 that updates neural unit states may likewise be implemented in various manners, but is preferably provided as dedicated hardware for optimal performance.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The invention claimed is:

1. A neuromorphic processor comprising:
   a plurality of neuromorphic elements, each neuromorphic element of the plurality of neuromorphic elements having a respective state memory entry for storing a state of the neuromorphic element;

a message exchange facility to enable the plurality of neuromorphic elements to transmit neural event messages and to receive transmitted neural event messages, wherein a neural event message includes:

an indication of one or more of the plurality of neuromorphic elements selected as a destination, and a message type; and a computation unit to update the state of a respective one of the plurality of neuromorphic elements based on a received neural event message received by the respective one of the plurality of neuromorphic elements;

wherein the message type of the received neural event message indicates that the received neural event message is an accumulation message or a leakage message, wherein the accumulation message instructs the computation unit to modify a state value of the respective one of the plurality of neuromorphic elements by addition or subtraction of a value indicated as a parameter in the accumulation message, and wherein the leakage message instructs the computation unit to modify the state value by reduction of the state value with a leakage value that is correlated with the state value.

2. The neuromorphic processor according to claim 1, wherein the leakage value is equal to a binary shifted difference between the state value and a bias value.

3. The neuromorphic processor according to claim 2, wherein a binary shift is specified by a binary shift value specified as a parameter in the leakage message.

4. The neuromorphic processor according to claim 2, wherein the bias value is specified as a parameter in the leakage message.

5. The neuromorphic processor according to claim 2, wherein the bias value is a predetermined value.

6. The neuromorphic processor according to claim 1, wherein the plurality of neuromorphic elements form a neuromorphic cluster of neuromorphic elements, and wherein the plurality of neuromorphic elements share a common memory facility.

7. The neuromorphic processor according to claim 6, wherein the neuromorphic cluster is to update the states of the plurality of neuromorphic elements of the neuromorphic cluster on a time-shared basis.

8. The neuromorphic processor according to claim 1, wherein each respective neuromorphic element of the plurality of neuromorphic elements comprises a respective computation unit having dedicated access to the respective state memory entry for the respective neuromorphic element.

9. The neuromorphic processor according to claim 6, wherein the neuromorphic cluster is one of a plurality of neuromorphic clusters, and wherein each one of the plurality of neuromorphic clusters have access to a message exchange network.

10. A neuromorphic processing method comprising:

storing a state of each one of a plurality of neuromorphic elements in a respective state memory entry of a plurality of state memory entries;

enabling neuromorphic elements of the plurality of neuromorphic elements to transmit neural event messages, and to receive transmitted neural event messages, a neural event message including an indication of one or more of the plurality of neuromorphic elements selected as a destination, and a message type; and updating the state of a respective one of the plurality of neuromorphic elements based on a received neural event message received by the respective one of the plurality of neuromorphic elements;

wherein the message type of the received neural event message indicates that the received neural event message is an accumulation message or a leakage message, wherein the accumulation message causes modifying of a state value of the respective one of the plurality of neuromorphic elements by addition or subtraction of a value indicated as a parameter in the accumulation message, and wherein the leakage message causes modifying of the state value by reduction of the state value with a leakage value that is correlated with the state value.

11. The neuromorphic processor according to claim 3, wherein the bias value is specified as a parameter in the leakage message.

12. The neuromorphic processor according to claim 3, wherein the bias value is a predetermined value.

13. The neuromorphic processor according to claim 1, wherein the leakage value is correlated with the state value and dependent on one or more parameters contained in the leakage message.

14. The neuromorphic processing method according to claim 10, wherein the leakage value is correlated with the state value and dependent on one or more parameters contained in the leakage message.

15. The neuromorphic processing method according to claim 10, wherein the leakage value is equal to a binary shifted difference between the state value and a bias value.

16. The neuromorphic processing method according to claim 15, wherein a binary shift is specified by a binary shift value specified as a parameter in the leakage message.

17. The neuromorphic processing method according to claim 15, wherein the bias value is specified as a parameter in the leakage message.

18. The neuromorphic processing method according to claim 15, wherein the bias value is a predetermined value.

19. The neuromorphic processing method according to claim 10, wherein the plurality of neuromorphic elements form a neuromorphic cluster of neuromorphic elements, and wherein the plurality of neuromorphic elements share a common memory facility.

20. The neuromorphic processing method according to claim 19, comprising updating the states of the plurality of neuromorphic elements of the neuromorphic cluster on a time-shared basis.

* * * * *